United States Patent [19]

van der Waaij

[11] 3,954,429

[45] May 4, 1976

[54] GERM-FREE AIR SUPPLY DEVICE

[75] Inventor: Dirk van der Waaij, Voorburg, Netherlands

[73] Assignee: Pielkenrood-Vinitex B.V., Assendelft, Netherlands

[22] Filed: Sept. 9, 1974

[21] Appl. No.: 504,194

Related U.S. Application Data

[63] Continuation-in-part of Ser. No. 263,587, June 16, 1972, Pat. No. 3,893,457.

[30] Foreign Application Priority Data

Sept. 25, 1973 Netherlands ........................ 7313227

[52] U.S. Cl. .................................... 55/279; 55/316; 55/385 A; 55/413; 55/473; 55/DIG. 29; 128/1 R; 98/36; 21/74 R

[51] Int. Cl.[2] .......................................... B01D 50/00

[58] Field of Search ............. 55/279, 316, 385, 413, 55/416, 467, 473, DIG. 18, DIG. 29, 411, 412; 21/74 R, 53; 62/256, 261; 98/36, 89, 115 R; 128/1 R; 5/2 B, 60, 92, 163, 284; 4/146

[56] References Cited

UNITED STATES PATENTS

| | | | |
|---|---|---|---|
| 2,280,984 | 4/1942 | Thurnau | 98/115 R |
| 2,695,413 | 11/1954 | Termaat | 55/284 X |
| 2,908,212 | 10/1959 | Bryant | 98/36 |
| 3,151,929 | 10/1964 | Potapenko | 55/DIG. 29 |
| 3,176,322 | 4/1965 | Mulcahy | 5/92 |
| 3,505,989 | 4/1970 | Truhan | 55/385 X |
| 3,511,162 | 5/1970 | Truhan | 98/36 |
| 3,709,210 | 1/1973 | Matthews | 128/1 R |
| 3,719,136 | 3/1973 | Criddle | 55/473 |
| 3,824,770 | 7/1974 | Eckstein | 55/316 |

*Primary Examiner*—Frank W. Lutter
*Assistant Examiner*—David L. Lacey
*Attorney, Agent, or Firm*—Ralf H. Siegemund

[57] ABSTRACT

A device for supplying a germ-free air flow over an operating table, comprising a cabinet with a blower-filter unit and outflow openings near the free extremity and below the lateral sides of an operating table, which openings are provided in a U-shaped tube to be connected to this table, the connection between said tube and said unit being formed by a movable tube connection allowing an adaptation to various table heights and dimensions. This tube assembly can be swung upwards and covered by curtains for disinfection in a disinfectant vapor circulated by said unit and through an additional filter or by an additional blower-filter unit.

10 Claims, 3 Drawing Figures

GERM-FREE AIR SUPPLY DEVICE

Figure 1:
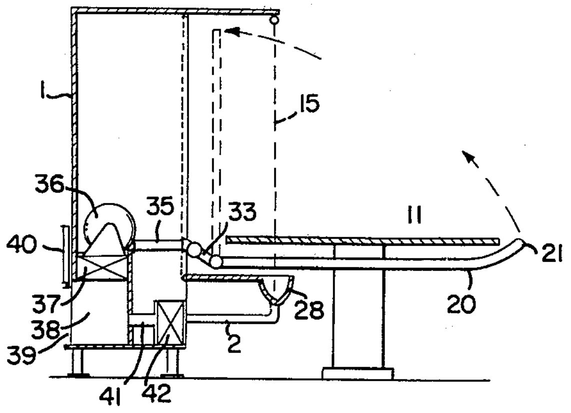

This application is a continuation-in-part of U.S. patent application Ser. No. 263,587, filed on June 16, 1972 now U.S. Pat. No. 3,893,457.

In copending U.S. patent application Ser. No. 263,587, filed June 16, 1972, and assigned to the same assignee, a device for supplying a germ-free air flow over an operating table has been described, which device comprises a filter cabinet with blowers and a substantially vertical exit surface, which cabinet is adapted to be positioned at one extremity of an operating table, said filter cabinet having such a width that the outflowing air flow also covers the space laterally of the operating table, which device, in accordance with the present invention, is provided with additional outflow openings near the free extremity and below the top of the operating table, which openings are provided in the wall of a substantially U-shaped tube extending along the sides and the front of the operating table.

The U-tube is attached to the operating table, and is connected, by means of a hose or tube, to a separate filter-blower unit, so that lateral air flows are blown into the space laterally and in front of the operating table from the outflow openings of this U-tube, which flows oppose the penetration of ambient air from below. The space laterally of the operating table can be closed behind the surgeons and assistants downwards to a given height from the floor by means of curtains movable along guides, which guides can be folded back before the exit surface of this filter cabinet in order to close the space before this surface by means of these curtains. It is then possible to blow fumes of a disinfectant into this space so as to disinfect the shelves for instruments and the like present in that space. By means of said filter unit these fumes can be removed again from this space by the intermediary of an absorption filter for this disinfectant, so that these fumes cannot cause any inconvenience for the surroundings.

This additional unit, however, requires space also during the use of the operating table, and also the hoses can be objectionable. Moreover this unit and the additional absorption filters are to be stored separately, and the U-tube is to be disinfected separately.

The invention provides an improvement of this device, in which the blower-filter unit for the U-tube and also the absorption filter are included in the filter cabinet, the U-tube being connected to said cabinet. To that end this U-tube is connected, by means of T-joints, to a substantially horizontal supply tube for the air made germ-free by filtering, which tube is substantially parallel to the front wall of the filter cabinet, this assembly being rotatable around the longitudinal axis of the supply tube, so as to enable to swing the U-tube from the horizontal into a substantially vertical position.

This U-tube can swing upwards into the space which, subsequently, can be closed by the curtains which swing towards the cabinet, in order to be disinfected, and, moreover, the U-tube can then be stored dust-free in a simple manner. Only simple suspension means for this tube are to be provided on the operating table which considerably simplifies the provision of such a tube on an existing operating table.

In order to allow the tube to be adapted to different heights of the operating table, the supply tube is, preferably, made vertically movable parallel to itself by means of articulated connections, and, moreover, an adaptation to an operating table situated laterally of the median plane is possible if the T-joints are constructed as sliding bushes which are displaceable on the supply tube. By providing an additional sliding bush in the bight portion of the U-tube, the latter can, in addition, be adapted to different widths of operating tables.

In particular the absorption filter is connected in a switchable manner to the blower of the unit serving the U-tube so as to enable, in the folded condition of the U-tube, to suck away air from the space behind the closed curtains through said filter, and, subsequently, to blow in air into said space through the U-tube.

Figure 2:
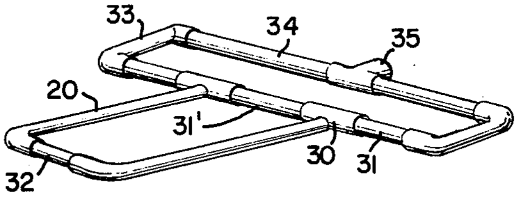
Figure 3:
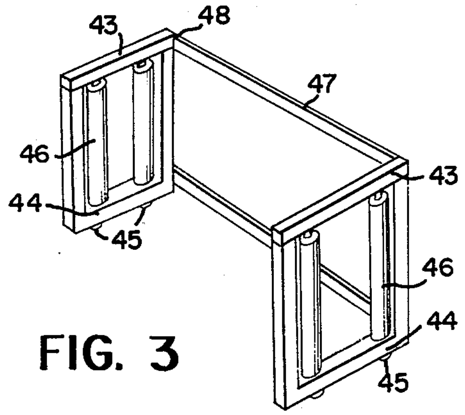

The invention will be elucidated below by reference to a drawing, showing in:

FIG. 1 a simplified schematic cross-section of the device of the invention;

FIG. 2 a representation in perspective of the U-tube assembly of this device;

FIG. 3 a schematic representation in perspective of a lifting apparatus for this device.

In FIG. 1 the device according to the prior patent application is shown in which the same reference numerals as in said older patent application have been used. For a complete description of this device, reference is made to said prior patent application.

This device comprises a U-tube with legs 20 extending along and slightly below the lateral sides of an operating table 11, and a transverse part 21 of this tube is situated before the free extremity of this table and is bent slightly upwards. Slots or openings in this tube not indicated in the drawing provide the desired transverse air flows.

FIG. 2 shows the complete improved U-tube assembly according to the invention. The extremities of the legs 20 are hingedly connected to a transverse tube 31 by means of T-joints 30 which connect with this transverse tube in an air-tight manner, which T-joints 30 are, in particular, constructed as sliding bushes so that a given displacement in the longitudinal direction of the tube 31 is made possible. In this manner the operating table can be positioned also outside the median plane, for instance if, at one side of the table, bulky auxiliary apparatus are to be positioned. The sliding bushes 30 can form one unit, but it is also possible to use separate bushes which are slidably interconnected by means of a tube portion 31', and then a sliding bush 32 can be provided in the transverse part 21 thus allowing to adapt the width of the U-tube to different widths of the operating tables.

The transverse tube 31 is at both ends connected to U-shaped hinge tubes 33 which are rotatably and sealingly connected to the tube 31 and to a supply tube 34, the latter being connected to the filter cabinet 1. In this manner the tube 31 can be moved parallel to itself, thus enabling a parallel adjustment of the height of the U-tube 20 so as to follow the height adjustment of the operating table. For instance the legs 20 can be suspended by means of hooks or braces on the operating table 11.

The supply tube 34 is provided with a junction 35 to be connected to a blower-filter unit. The latter is now housed in the filter cabinet 1 so that loose hose connections are superfluous.

In FIG. 1 the location of this unit is schematically indicated. This unit comprises a blower 36, which is connected to the junction 35, the suction side of this blower communicating via a dust filter 37 with a suction box 38 which connects with the ambient air through an opening 39 in this cabinet 1, which opening can be closed by means of a slide valve 40.

In the suction box 38 a connecting duct 41 opens which by the intermediary of an absorption filter 42, connects with a connection 29 of a collecting trough 28. When, as described in the afore-mentioned prior patent application, curtains 15 closing the spaces laterally of the operating table downwards to a given height from the floor, are swung inwardly so as to close the space before the cabinet 1 in which shelves not shown are present for storing instruments and the like, the latter space can be disinfectant by spraying into that space a disinfectant such as peracetic acid. This acid will then drip downwards along the curtains, and is collected in the trough 28. When air is exhausted through the connection 29, the mist and the liquid collected in this trough can be removed, the absorption filter 42 ensuring that the disinfectant will not reach the environment. The curtains are thus mounted on the filter cabinet by means of horizontally hinged guides so that the curtains may be positioned in front of the exit surface of the cabinet and cooperate with the cabinet to form an enclosed space.

By connecting the suction duct 41 to the suction box 38, the air exhaust, after closing the slide valve 40, will be provided by the blower 36. The air stripped of the disinfectant is then led towards the U-tube 20 which is swung upwards and is situated in the space behind the curtains 15. In this manner a substantially closed cycle is obtained. An additional advantage is that also the U-tube is disinfected. The trough 28 can be hingedly suspended again, as described in the said prior patent application. If the length of the operating table is larger than the height of the cabinet 1, the legs 20 of the U-tube can be made telescoping.

It will be clear that the connection between the absorption filter 42 and the blower 36 can also be effected in a different manner, for instance by means of change-over valves, and then the dust filter 37 can be excluded from the cycle if desired.

Such a device requires considerably less space than the device according to the above-mentioned prior patent application, since, now, no separate filter-blower unit for the U-tube is required, and, moreover, the U-tube can be stored germ-free behind the curtains of the filter cabinet. Moreover the described U-tube can be easily adapted to and suspended on existing operating tables.

In order to easily move and vertically adjust such a device, preferably a lifting apparatus schematically shown in FIG. 3 is used. This apparatus comprises two frames with upper beams 43 and lower beams 44, the latter being supported on wheels 45. Between said beams lifting cylinders 46 are provided. These beams are interconnected by means of transverse bars 47 which are connected at 48 either releasably or hingedly to said frames, so that the whole assembly can be easily folded to small dimensions when not in use. The cylinders are preferably operated by oil which is, for instance, pressurized by means of compressed air, for which purpose use can be made of a compressed air conduit which is generally present in the operating theatre. Of course it is also possible to perform the height adjustment electrically or by hand. The beams 43 are brought into engagement with the lower surface of projecting parts of the cabinet 1 which, after lifting the frames, bear thereon.

It will be clear that within the scope of the invention many modifications are possible.

I claim:

1. In a device for supplying a germ-free air flow over an operating table, said device including a filter cabinet having a blower means therein and a substantially vertical exit surface, means cooperating with the blower to form a supply of germ-free air, the cabinet having a front wall and being positionable at one extremity of an operating table, the width of the filter cabinet being such that outflowing air also covers the space laterally thereof, the improvement comprising means cooperating with said cabinet to provide for germ-free air flow, said means including a substantially U-shaped tube, including side legs interconnected by a transverse leg, said tube being provided with openings for flow of germ-free air therethrough, supply tube means mounted in spaced parallel relation to the cabinet front wall and disposed in a generally horizontal plane, the side legs extending outwardly of said supply tube away from the cabinet front wall and being spaced from each other by said transverse leg, and means mounting said U-shaped tube in rotatable relationship with said supply tube means for rotational movement of said U-shaped tube around the longitudinal axis of said supply tube means whereby said U-shaped tube may be moved between a vertical and horizontal position.

2. The device as set forth in claim 1 further including tube sections hingedly connected at one end to the ends of said supply tube means, said tube sections being substantially perpendicular to the supply tube means, transverse supply tube means hingedly connected to the other ends of said tube sections, and said U-shaped tube being connected to said transverse supply tube means and being in rotatable relation thereto whereby the transverse supply tube is adjustable in height to permit the U-shaped tube to be positioned at different height adjustments relative to an operating table.

3. The device as set forth in claim 2 wherein said U-shaped tube is slideably connected to the transverse supply tube means in order to permit said U-shaped tube to be moved axially along said transverse supply tube means.

4. A device as set forth in claim 1 wherein said U-shaped tube is slidingly mounted to said supply tube, and wherein said transverse leg includes sliding coupling means so as to permit increasing or decreasing the dimension between the side legs of the U-shaped tube.

5. A device as set forth in claim 1 wherein said mounting means includes T-joints and additional tube means in parallel spaced relation to said supply tube means, means connecting said additional tube means to said supply tube means for swinging movement of said additional tube means relative to said supply tube means, and said U-shaped tube being rotatably mounted on said additional tube means for movement between a horizontal and vertical plane.

6. A device as set forth in claim 5 wherein said U-shaped tube includes bushings for movement of said U-shaped tube along the axis of said additional tube means.

7. A device as set forth in claim 1 wherein said filter cabinet includes curtains, means cooperating with said filter cabinet and including substantially horizontal hinged guides for mounting said curtains whereby said curtains may be positioned in front of the exit surface of said cabinet and cooperates with the cabinet to form an enclosed space, substantially horizontal trough means positioned in front of said cabinet so that the curtains, when positioned in front of the cabinet, overhang the trough means, discharge duct means connected to said trough means, and said duct means being connected to an adsorption filter and a filter blower unit mounted in said cabinet whereby disinfectant sprayed into said enclosed space may contact said curtains and deposit in said trough to be removed through the duct and adsorbed on said filter.

8. A device as set forth in claim 7 further including means in said cabinet to control flow of air to said supply tube means and to permit flow of air into said adsorption filter through said discharge duct.

9. A device as set forth in claim 1 wherein said blower means are operative to supply air to said supply tube means, exhausting means positioned in front of said cabinet and including a trough connected to a duct and filter, and means selectively connecting said blower to one of said supply tube means and to said exhausting means.

10. A device as set forth in claim 1 wherein said U-shaped tube is movable along the axis of said supply tube means, and said U-shaped tube including means to vary the distance between the side legs while maintaining air flow therethrough.

* * * * *